INVENTORS
JOHN L. FONCANNON
ERNEST F. ADAMS
BY
ATTORNEY

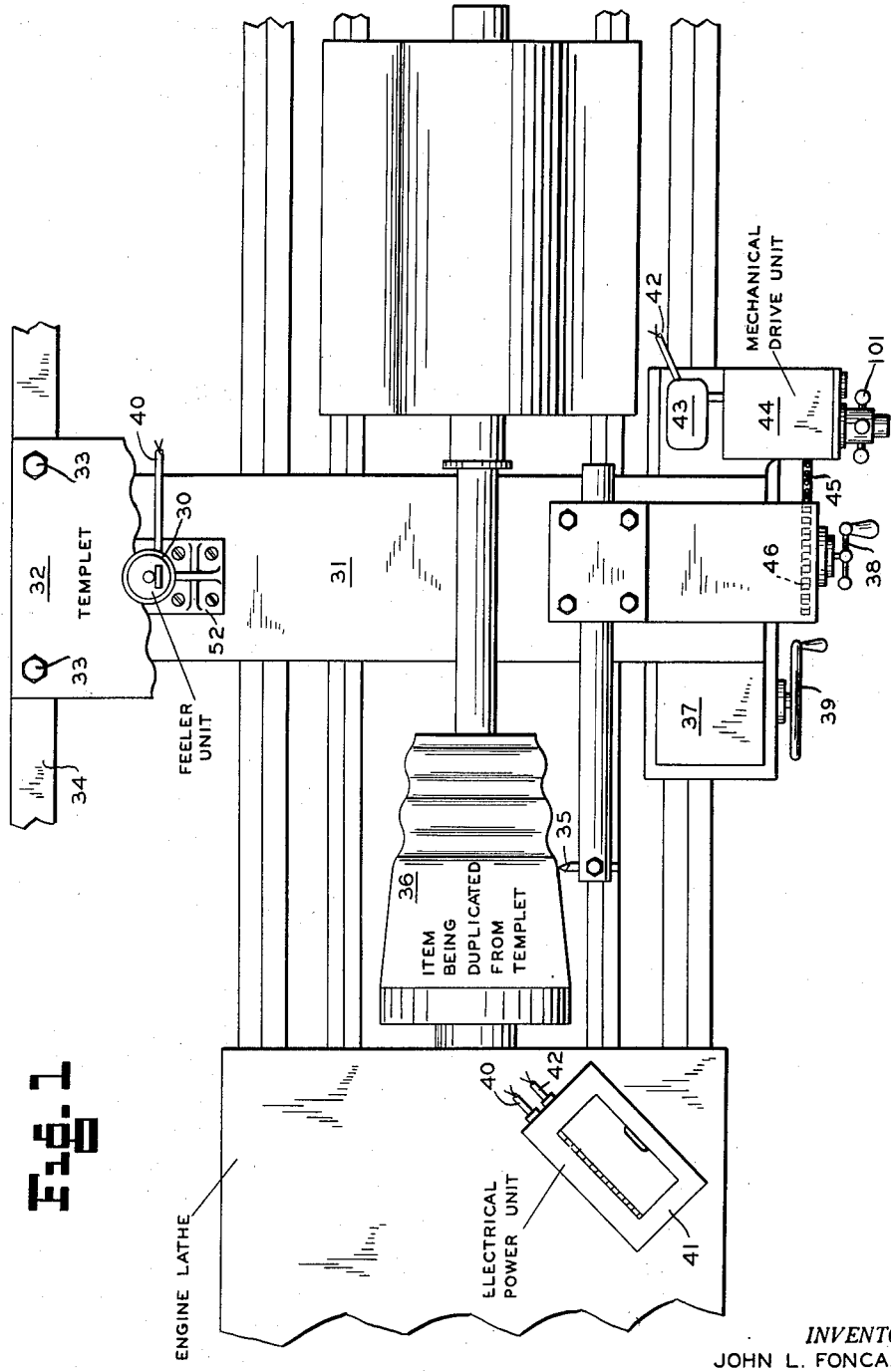

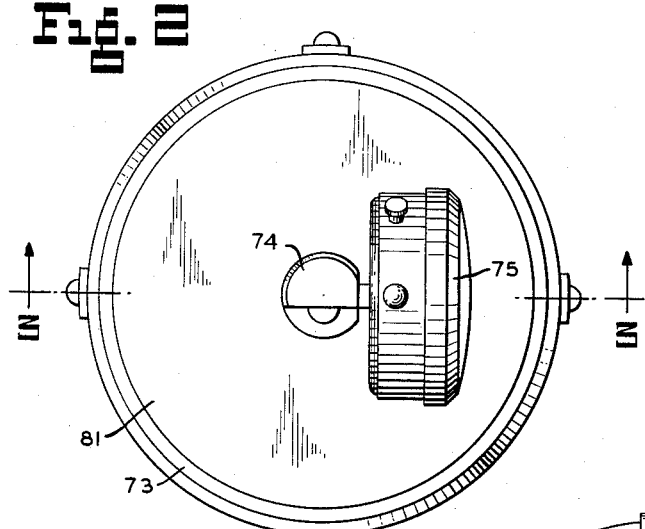
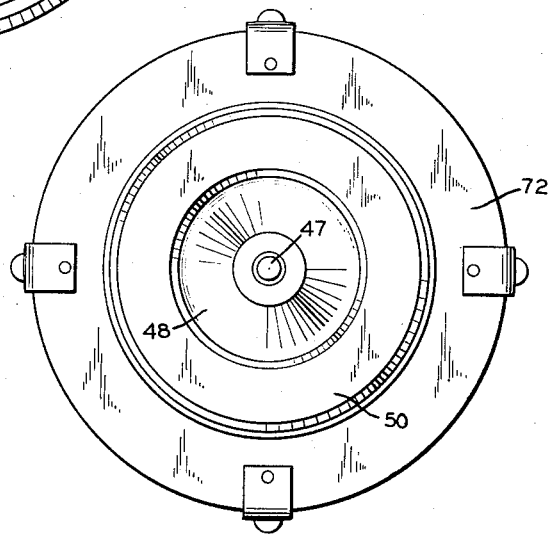
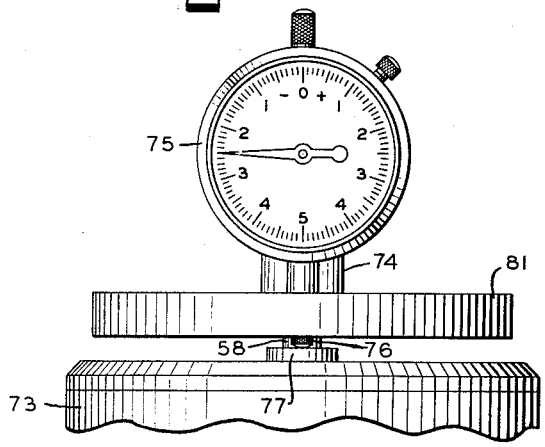

Jan. 13, 1959  J. L. FONCANNON ET AL  2,868,092
CONTOUR SENSING CONTROL FOR MACHINE TOOLS
Filed April 2, 1956  5 Sheets-Sheet 4

*INVENTORS*
JOHN L. FONCANNON
ERNEST F. ADAMS
BY
*ATTORNEY*

Jan. 13, 1959 J. L. FONCANNON ET AL 2,868,092
CONTOUR SENSING CONTROL FOR MACHINE TOOLS
Filed April 2, 1956 5 Sheets-Sheet 5
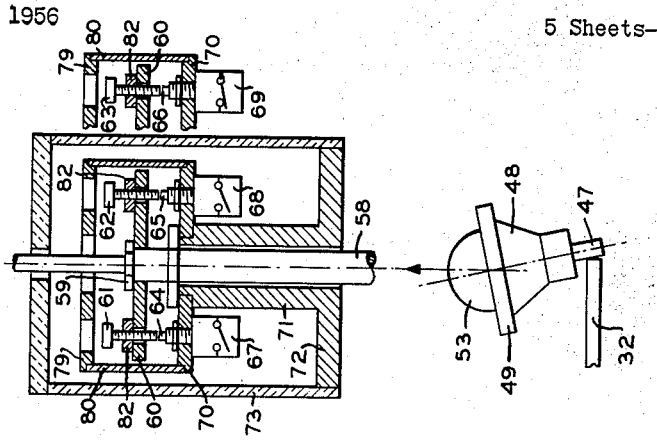
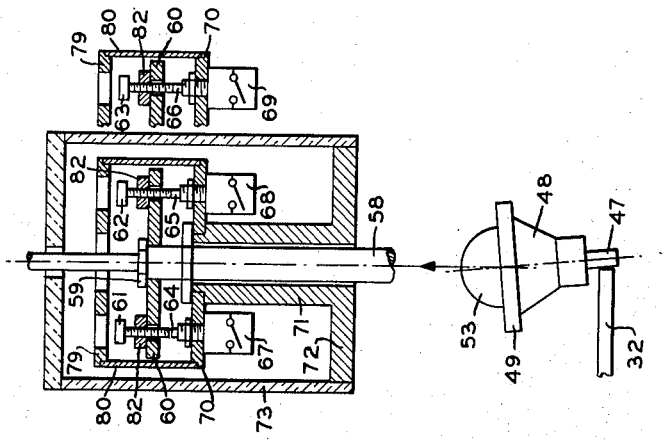
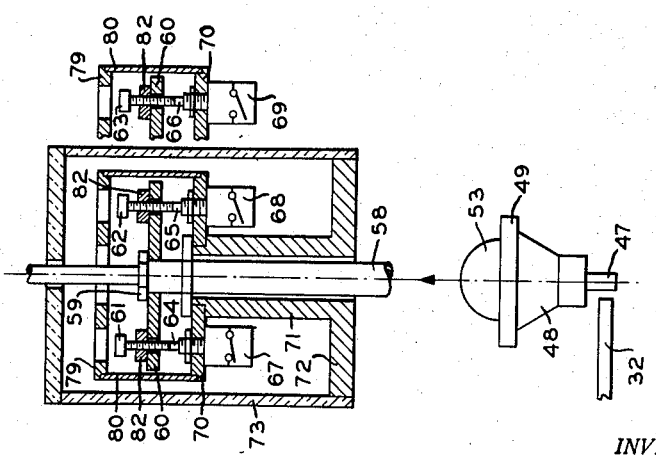
*INVENTORS*
JOHN L. FONCANNON
ERNEST F. ADAMS
BY
ATTORNEY

2,868,092
CONTOUR SENSING CONTROL FOR MACHINE TOOLS

John L. Foncannon and Ernest F. Adams, Wichita, Kans., assignors to Beech Aircraft Corporation, Wichita, Kans., a corporation of Delaware Application April 2, 1956, Serial No. 575,610

3 Claims. (Cl. 90—62)

The invention here disclosed relates to the control of machine tools such as engine lathes, milling machines and the like.

The general objects of the invention are to provide simple, practical mechanism for sensing an outline to be developed and for controlling the machine to accurately reproduce that same contour.

Special objects of the invention are to provide such apparatus in a form readily applicable to existing machines of different types and at reasonable cost.

Other desirable objects attained by the invention and the novel features through which the purposes of the invention are accomplished are set forth and will appear in the course of the following specification.

The drawings accompanying and forming part of the specification are illustrative of a present commercial embodiment of the invention but structure and arrangement may be modified and changed in various ways as regards the immediate illustration, all within the true intent and scope of the invention as hereinafter defined and claimed.

Figure 1 in the drawings is a broken and somewhat diagrammatic top plan view of an engine lathe having the invention applied thereto. This view shows the feeler mounted on the cross slide carrying the tool in engagement with the work, in cooperative relation to a contour determining templet fixed at the back of the machine and controlling through an electric power unit a reverse drive unit coupled to operate the cross feed.

Figure 3 is a vertical sectional view of the same as on substantially the plane of line 3—3 of Figure 2.

Figure 4 is a bottom plan view of the feeler unit.

Figure 5 is a broken front elevation of the same showing particularly the gage indicating infeeding and outfeeding control movements of the feeler.

Figures 10, 11 and 12 are diagrammatic views illustrating control operation of the feeler.

Figure 2:
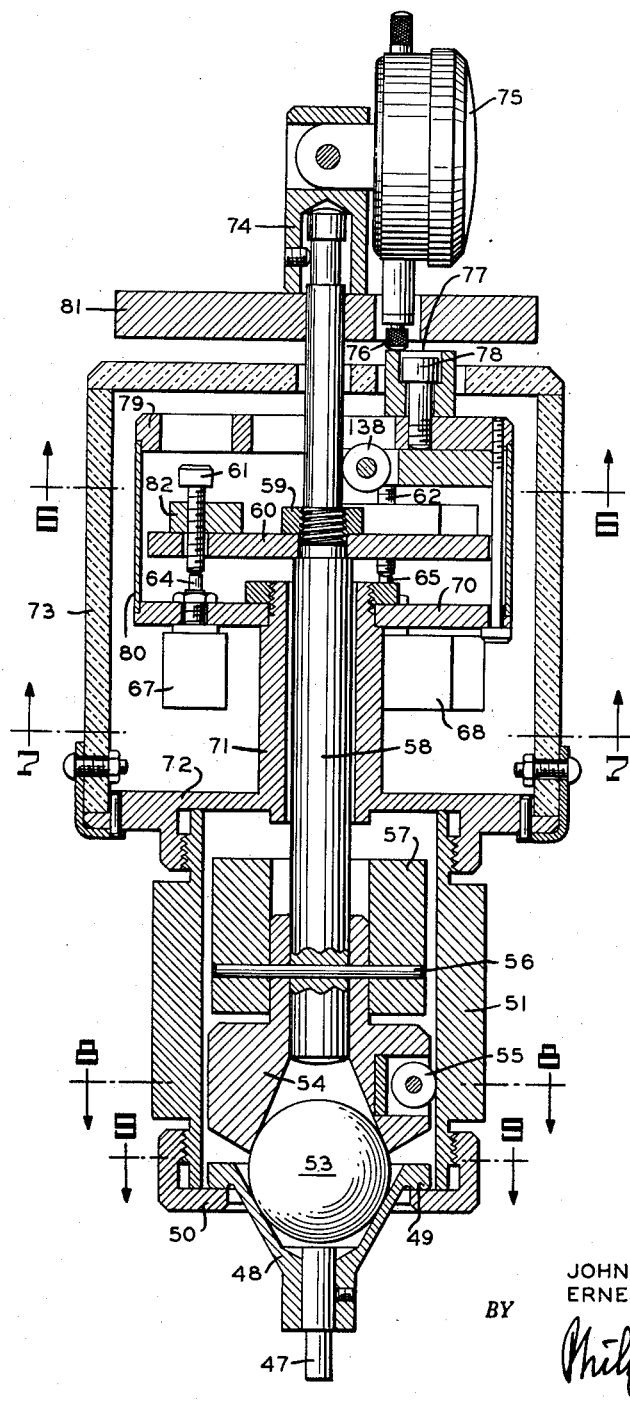
Figure 2 is a top plan view of the feeler unit.
Figure 6:
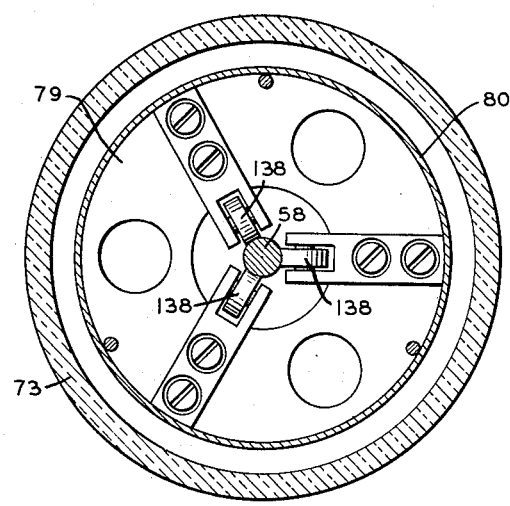
Figures 6, 7, 8 and 9 are horizontal sectional views on the planes correspondingly identified in Figure 3.

In Figure 1 the feeler is indicated at 30 mounted on the cross slide 31 in position to cooperate with the templet or contour cam 32 fixedly secured at 33 on a back extension of the bed of the machine or other suitable support 34.

The slide is shown carrying a tool 35 transforming the work 36 to the contour prescribed by the templet.

The cross slide and the carriage 37 carrying the slide may be considered as having conventional automatic and hand feed mechanisms, including the usual hand cranks or hand wheels 38, 39.

From the feeler, cable connections 40 are extended to an electrical power unit 41 and from this unit connections 42 are extended to the motor 43 for operating the drive or gear unit 44.

Final, mechanical connections are indicated in the form of a silent chain 45 running from the gear unit to a sprocket 46 on the feed shaft of the slide.

Consequently, in the longitudinal feed of the carriage, the feeler 30 tracing its way over the templet 32 will transmit electrical impulses through the electrical power unit 41 to govern the drive unit 44, thus to cause the tool to impart to the work the contour provided by the templet.

The whole system thus consists of but these few units readily applicable to machines presently in use.

The templet may be carried by a bracket or similar structure fixed to the back of the machine. The feeler can be readily mounted on the cross slide. The electrical power unit may be mounted in any convenient place, as on the head of the lathe, as shown, and the drive unit can be mounted by special bracket or otherwise on the front of the cross slide. The three main elements, feeler unit, electric power unit and drive unit need only to be connected by flexible cables.

The feeler unit, as shown in detail in Figures 3 to 9, comprises a dependent finger 47 for engagement with the templet, centered and supported for universal pendulous movement by being carried by a conical cup 48 flanged at 49 to seat on a screw flange abutment 50 at the lower end of a supporting housing 51. The latter provides the base of this instrument, being clamped or otherwise secured in the mounting bracket 52, Figure 1, which is bolted down on the cross slide.

Figure 8:
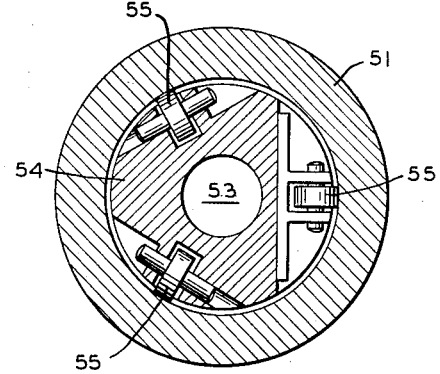
Figure 9:
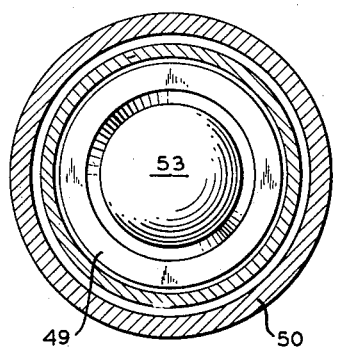
Figure 7:
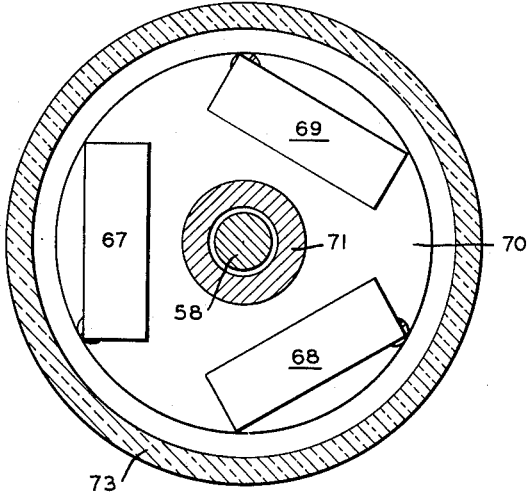

The finger cup 48 is centered and normally held down on its seat by a ball 53, Figure 3, engaged by an overstanding conical cup 54 centered friction free in the casing 51 by radially disposed rollers 55, Figure 8.

The upper ball cup 54 guided for free practically frictionless rising movements in the stationary casing has fixed in the top of it by a cross pin 56 and surrounding weight sleeve 57 an upwardly projecting impulse shaft or rod 58. On this rod is fixed by jam nut 59 a plate 60 carrying downwardly extended abutment screws 61, 62, 63 for actuating the plungers 64, 65, 66 of switches 67, 68, 69 mounted in stationary fashion on a supporting plate 70.

Figure 3 shows the switch supporting plate 70 secured fast on the upper end of a sleeve projection 71 carried by a screw flange 72 on the upper end of casing 51. This screw flange provides a support for a transparent casing 73 enclosing the switch mechanism.

The upper end of the feeler stem 58 is shown as having a sleeve 74 fixed thereon carrying a micrometer gage 75 having a stem 76 in engagement with an abutment 77 fixed by screw 78 on a disc 79 supported by annulus 80 on the stationary supporting disc 70. The gage will thus accurately register, usually in thousandths of an inch, the slight rising and falling movements imparted to stem 58 by tilting movements of the feeler finger.

A special feature of the invention is that the finger is urged toward and held in engagement with the templet by gravity instead of by spring force so as to avoid frictional drag, overthrow by spring reaction, inequalities in spring action and other such factors.

The weight may be provided by loading the stem 58, as by the fastening collar 57 and in this case by a weighting disc 81 attached to the gage mounting collar 74.

The switch actuating abutment screws 61, 62, 63 may be adjusted through appropriately located openings in the top plate 79 and they are shown as secured in adjusted relation by mounting them in split screw closed clamp blocks 82 so that after critical adjustments are made, the parts may be locked in desired relation.

In the present disclosure, switches 67 and 68 are of the supersensitive type and switch 69 an ordinary micro type switch.

Switches 67 and 68 are the infeeding and outfeeding switches respectively.

The first of these, switch 67, is of the self-opening type and the screw 61 is set to permit this switch to remain open when the feeler 47 is in free riding contact with the templet. If this contact is lost between feeler and templet as illustrated in Fig. 25, this switch closes to effect the infeeding control.

Switch 68 is of the self-closing type, the screw 62 being set to hold this switch open until the feeler finger is outwardly crowded or displaced, the extent determined as necessary or desirable to effect outfeeding control, Fig. 26.

Switch 69 is a self-closing safety signal switch normally held open by screw 63 but adapted to close and throw on a red light or other warning signal if the feeler finger is given any unusual or abnormal control movement beyond that for operation of the outfeeding switch 68, as shown in Fig. 27.

Operation will be clear by reference to Figs. 10, 11 and 12.

The first of these views shows the feeler finger 47 just out of contact with the profile cam 32, with parts of the feeler mechanism, Fig. 3, in the lowest possible position and with the stem 58 supporting the micrometer gage 75, Figure 5, at zero and switch actuating plate 60 allowing switch 67 to close while holding switch 68 open.

Also in the condition illustrated in Figures 10 and 11, the warning signal switch 69 is held open by the switch control plate 60.

While the system is in service, the motor 43 driving the gear unit is in continuous operation with infeeding and outfeeding clutches turning in opposite directions, each ready for instant activity.

When, as in Figure 10, the infeeding clutch is energized, the automatic infeed continues until feeler 47 makes contact with the templet; whereupon the slight lifting of the stem and switch actuating plate 60, caused by rocking of the feeler in engagement with the templet, will open the infeeding switch 67 without affecting open condition of the outfeeding switch 68.

For normal operations, there is a neutral position between actuation of these two switches of about one-thousandth of an inch. This may be adjustable. This neutral condition may continue so long as the feeler remains in free riding engagement with the templet, as in effecting a straight, unvarying cut.

Figure 11 shows how with pressure of the finger against the templet as in encountering a slope or curve in the edge of the pattern, the feeler will be tilted to lift the switch actuating plate 60 far enough to close the outfeeding switch 68, leaving infeeding switch 67 still open.

The reversely rotating clutch will then be energized to drive the cross feed in the outfeeding direction. This operation continues until displacement of the feeler finger by the templet is again reduced to the point where the finger just rides the edge of the templet. Then, if a recession is encountered and the feeler finger, after settling on its seat, loses contact with the templet, the infeeding switch will close and start infeeding action of the cross feed.

The operation may thus shift back and forth as often as required to both sides of neutral.

If overfeeding occurs or the outfeed switch 68 fails to close or accession of the cam be faster than the outfeed can keep up with and the feeler finger is rocked to an extreme position, as illustrated in Fig. 12, switch 69 which has been held open during the normal operation described, will be permitted to close by the abnormal rising of switch actuating plate 60 to flash the warning signal 17.

The action of the feeler at all times is smooth and accurate. The only motion imparted the feeler parts is upward and comparatively slight. The feeler cup needs only a slight tilting movement to impart the rise to the switch operating stem. This stem is shown guided at the top by radially disposed rolls 138 and the ball confining cup at the bottom guided by similar rolls 55 so that motion is free, unimpeded and practically frictionless.

The feeler finger is restrained and yieldingly held by weight instead of by spring force and this enables vibration inherent in the operation of the machine to impart a minute tapping effect, keeping the feeler "alive" and the more sensitive and responsive to the templet. This tapping action on the weighted universally tiltable feeler finger also serves to overcome and prevent possible frictional dragging or sticking propensities.

While especially suited to and for that reason disclosed in conjunction with engine lathes, it is to be appreciated that the invention may be applied to many other uses as contemplated by the claims.

With different machines and with different work to be performed, the character of tools and slide or carriage carrying the same will vary. Also the character of templet and feeler finger may vary. While contact between the two is normally light, the finger may have an antifriction roll for engagement with the templet.

After setting the tool to a desired cut or shaping effect, no further attention is usually necessary since the operation is fully automatic and self-protective. The extent of cut or shaping effect may be changed at any time, if necessary.

In event of any overloading, the automatic control will first flash a warning and then may reduce the clutch coupling and finally stop the feed motor. Further, this motor stopping control may be used to shut down the main machine.

The automatic system can be set to control operations to an accuracy of within one-half thousandths of an inch or less. This is possible because of the inertia or gravity actuation of the feeler finger and the live condition of that finger occasioned by the constant weight tapping action and the live condition of the reversely turning clutches each ready for instant actuation.

The entire system, for what it accomplishes, consists of but relatively few parts, and can be produced at reasonably low cost, making it practical to apply it to many heavy and expensive machines to greatly increase their productiveness and utility.

What is claimed is:

1. Control tracer for cooperation with the contour cam of a duplicating machine, comprising supporting structure having a horizontally disposed annular supporting shoulder, a cup having a corresponding annular shoulder mounted free to rock on said supporting shoulder, an upright tracer finger dependent from said cup for cooperation with the contour cam, a ball supported in said cup, a ball confining cup inverted over said ball, means for guiding said ball confining cup in straight line vertical movement, a stem rising from said vertically movable ball confining cup, control switch mechanism operable by said stem, and means for weighting said ball confining cup and switch operating stem to hold said ball receiving cup normally seated on said annular supporting shoulder with said tracer finger in upright relation free of spring or other pressure forces.

2. The invention according to claim 1, in which said switch mechanism comprises a self-opening switch and means carried by said stem for holding said switch closed in the lowered position of the stem, and a second switch, of the self-closing type, and means carried by the stem for holding said second switch open in the lowered position of the stem.

3. The invention according to claim 2, in which said switch mechanism further includes a third switch, of the self-closing type and means carried by the stem for holding said third switch open in the lowered position of the stem and for permitting closing action of said third switch on maximum rising movements of said stem, and safety means connected to be actuated by said third switch.

References Cited in the file of this patent

UNITED STATES PATENTS

| | | |
|---|---|---|
| 1,879,196 | Green | Sept. 27, 1932 |
| 2,076,865 | Romaine | Apr. 13, 1937 |
| 2,373,332 | O'Neill | Apr. 10, 1945 |
| 2,469,170 | Mastney | May 3, 1949 |
| 2,553,984 | Siekmann et al. | May 22, 1951 |
| 2,556,318 | Cooper | June 12, 1951 |
| 2,695,089 | Unk | Nov. 23, 1954 |
| 2,756,852 | Findley | July 31, 1956 |

FOREIGN PATENTS

| | | |
|---|---|---|
| 725,163 | Great Britain | Mar. 2, 1955 |